Aug. 30, 1927.
G. F. EMBSHOFF
1,640,759
FUEL BURNER
Filed May 24, 1923    2 Sheets-Sheet 2
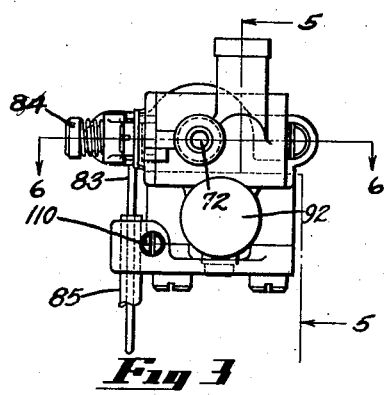
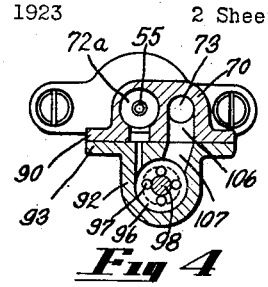
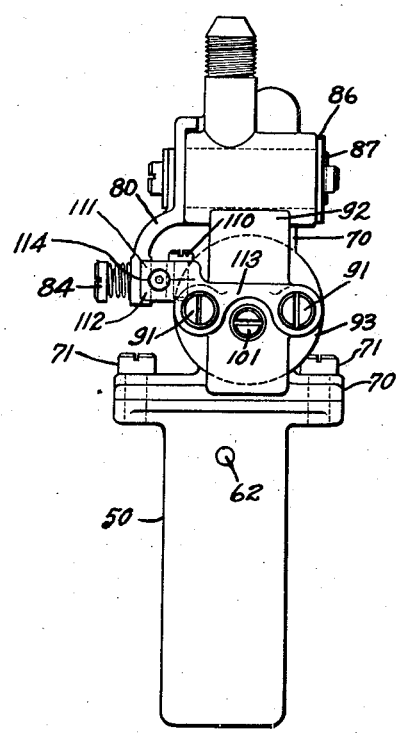
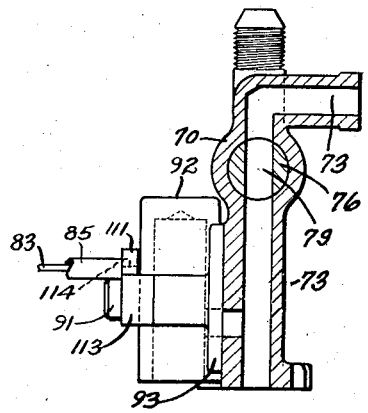
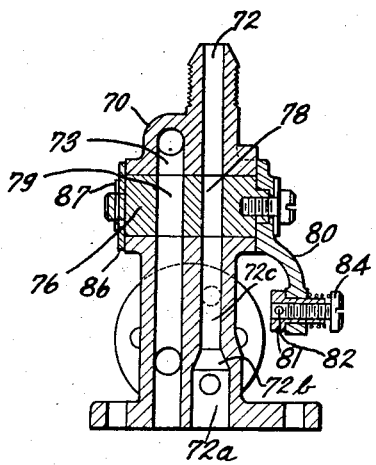

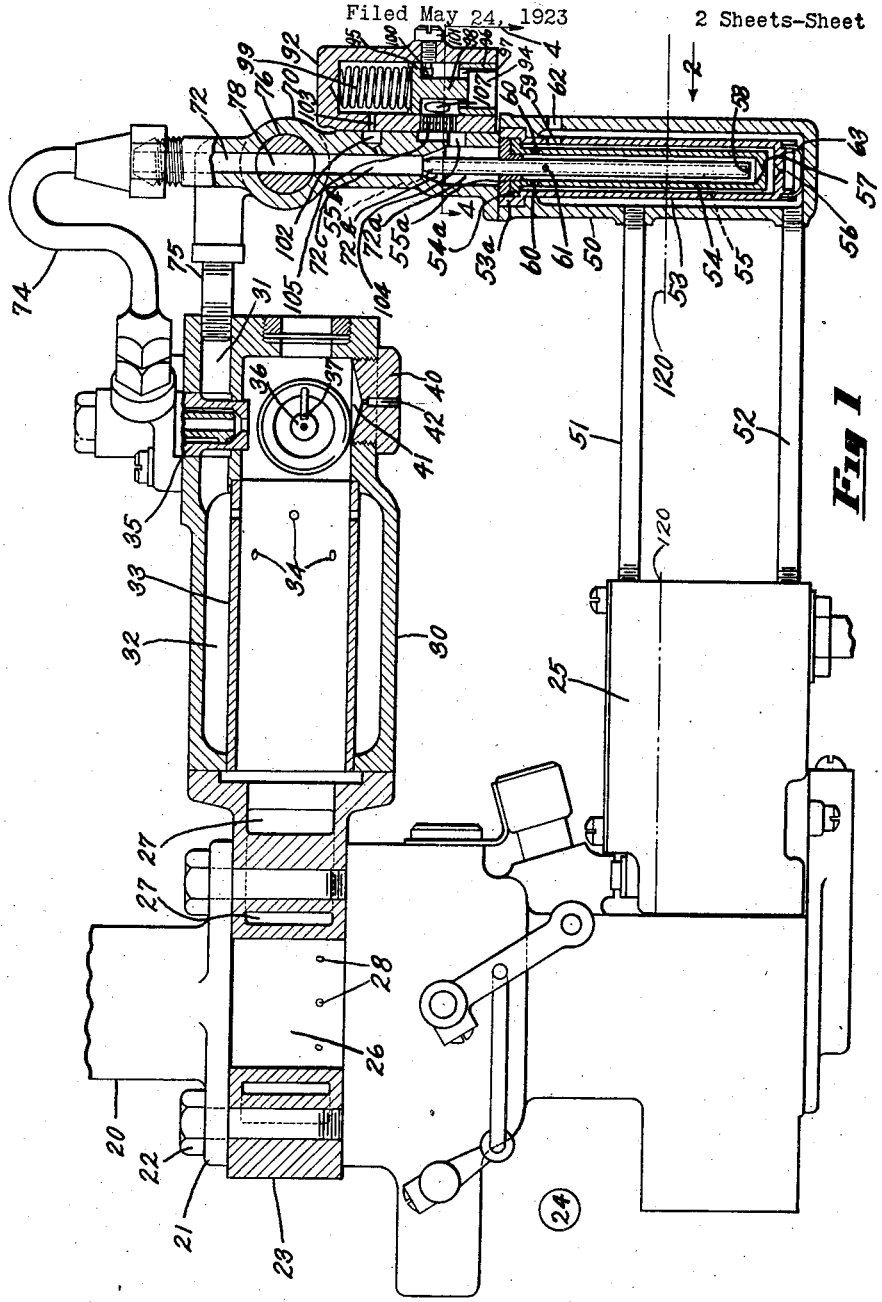

Patented Aug. 30, 1927.

1,640,759

UNITED STATES PATENT OFFICE.

GEORGE F. EMBSHOFF, OF DAYTON, OHIO, ASSIGNOR, BY MESNE ASSIGNMENTS, TO DELCO-REMY CORPORATION, OF DAYTON, OHIO, A CORPORATION OF DELAWARE.

FUEL BURNER.

Application filed May 24, 1923. Serial No. 641,253.

This invention relates to fuel burners for heating the intake of an internal combustion engine to assist in starting the engine when cold. The type of burner to which the present invention is particularly adapted is known as a suction burner for the reason that air and fuel are drawn into the burner by suction produced by the engine.

It is among the objects of the present invention to provide improvements in apparatus for automatically controlling the flow of fuel and air into the burner so that the operation of the burner will be relatively uniform over a wide range of engine speeds.

Further objects and advantages of the present invention will be apparent from the following description, reference being had to the accompanying drawings, wherein a preferred embodiment of the present invention is clearly shown.

In the drawings:

Fig. 1 is a side elevation of a carburetor, and a sectional view of a liquid fuel burner and burner carburetor therefor, and automatic apparatus for controlling the burner.

Fig. 2 is an end view of the burner carburetor and automatic controller looking in the direction of arrow 2 in Fig. 1;

Fig. 3 is a plan view of the apparatus shown in Fig. 2;

Fig. 4 is a sectional view taken on the line 4—4 of Fig. 1;

Fig. 5 is a sectional view taken on line 5—5 of Fig. 3, and

Fig. 6 is a sectional view taken on line 6—6 of Fig. 3.

Referring to Fig. 1, 20 designates the intake of an internal combustion engine provided with a flange 21 to which is attached by bolts 22, a burner adapter 23 and a carburetor 24 including a float bowl 25. The adapter 23 provides a passage 26 for engine fuel from the carburetor 24 to the intake 20. The wall of the passage 26 is surrounded by a chamber 27 for receiving the products of combustion of a burner, to be described. A plurality of holes 28 connect the chamber 27 with the passage 26 so that the combustion products of the burner are drawn into the engine intake to heat the engine fuel by direct contact.

A burner body 30 is attached in any suitable manner to the adapter 23 and is provided with an air inlet passage 31 leading to an air distributing chamber 32 surrounding a sleeve 33 provided with a plurality of air distributing holes 34. A fuel nozzle 35 projects across the passage 31 which is enlarged so that air may be conducted around the nozzle 35 for cooling purposes. The nozzle 35 is preferably of the type disclosed in the copending application of Hunt, Fitzsimmons and Embshoff, Serial No. 484,049, filed July 12, 1921. The burner supports a spark plug, the points of which are indicated at 36 and 37, which is connected with suitable ignition apparatus for producing a spark intermittently between the points in order to ignite the fuel in the burner and maintain the burner in operation as long as desired. Burner body 30 supports a plug 40 provided with a cavity 41 and an orifice 42 leading to outside atmosphere. As explained in the application referred to, before the burner is warmed up, some of the fuel particles issuing from the nozzle 35 will not be burned immediately but condense and collect in the cavity 41 and then be sprayed upwardly toward the spark plug points 36 and 37 by air entering the burner through the orifice 42.

Fuel for the burner is provided by a carburetor which includes a fuel well 50 supported in any suitable manner, for example, by means of relatively stiff pipes 51 and 52 attached to the carburetor bowl 25. The pipe 51 is used as an air pipe connecting the bowl 25 and the well 50, and pipe 52 conducts fuel from the bowl 25 to the well 50. Nested within the well 50 are compensating wells 53 and 54 and a fuel nozzle 55, which are provided with fuel metering orifices 56, 57 and 58, respectively, and with air inlets 59, 60 and 61, respectively. The main well 50 is provided with an air inlet 62. As shown in Fig. 1, a flanged upper end 53ª of well 53 is supported within a recess provided by the well 50 and supports the flanged upper end 54ª of well 54 and a collar 55ª attached, as by soldering, to the nozzle 55. The lower end of well 53 is provided with a screen 63.

A valve frame 70 is attached to the well 50 by screws 71 and is provided with fuel and air passages 72 and 73 which are connected by means of pipes 74 and 75, respectively, with the burner nozzle 35 and with the air inlet 31. Passages 72 and 73 are manually controlled by means of rotatable valve 76 having fuel and air ports 78 and 79 for controlling the flow of fuel and air through the passages 72 and 73 respectively. Valve 76 is actuated by lever 80 carrying rotating bushing 81 provided with an orifice 82 through which may be inserted a Boden wire 83 secured in position by a set screw 84. The Boden wire 83 leads through a Boden wire tube 85 to a suitable location on the dash board of an automobile where it is attached to a suitable lever or push rod. The valve 76 is retained in position by means of the lever 80 and by means of a washer 86 held in position by cotter pin 87. The passage 72 includes a large portion 72$^a$ which tapers at 72$^b$ into a passage 72$^c$ of smaller diameter. The nozzle 55 projects through the portions 72$^a$ and 72$^b$ and terminates substantially at the lower end of the portion 72$^c$. The upper end of nozzle 55 is beveled at 55$^b$ and the space between the upper end of the nozzle and the passage 72$^b$ provides a restriction or Venturi passage producing a partial vacuum just above the upper end of the nozzle 55 when air is drawn upwardly.

The frame 70 is provided with a circular mounting pad 90 to which is bolted, by screws 91, a cylinder 92 having a circular mounting pad 93 conforming to the pad 90. Within the cylinder 92 there is a piston 94 which includes an upper flange 95 and a lower flange 96 provided with an orifice 97. The flanges 95 and 96 are connected by a stem 98. A spring 99 manually maintains the flange 95 in engagement with a stop 100 provided on the end of a screw 101. Passages 102 and 103 provided in the frame 70 and in the cylinder 92 respectively, connect the cylinder 92 above the piston 94 with the fuel passage 72. The space between the piston flanges 95 and 96 is connected with the passage 72$^a$ by means of a port 104 provided in the frame 70 and is in communication with a vertical row of horizontally extending small orifices 105 which are arranged to be controlled by the flange 96 of piston 94. The space between piston flanges 95 and 96 is connected with the air passage 73 by means of passages 106 and 107 provided in frame 70 and in cylinder 92, respectively.

The Boden wire tube 85 is clamped by means of screw 110 between the jaws 111 and 112 provided by sawing into a bracket 113 as indicated by the line 114. The bracket 113 is attached to frame 70 by the screws 91 which also secure the cylinder 92 in position.

The operation of the invention is as follows: While the engine is at rest, the fuel level in the nozzle 55 and wells 54, 53 and 50 will be at the level of the fuel in the float bowl 25. This level is indicated substantially by the line 120. When the engine is being cranked, this level will soon drop to the level of the lower end of nozzle 55. Since the level 120 is nearer to the burner, a richer fuel mixture will initially be provided in order to facilitate lighting the burner. After the initial accumulation of fuel has been exhausted and the fuel level has descended to substantially that of the orifice 58, fuel will be metered through the orifices 56, 57 and 58 while air is being metered through the orifices 62, 59, 60 and 61. The fuel orifices 56, 57 and 58 and the air orifices 62, 59 and 60 are so related that they cooperate to produce substantially constant fuel mixture proportions over a relatively wide range of engine intake suction. By using a plurality of compensating wells, the fuel metering orifices can be made larger than if only one compensating well were used, or where the compensating wells are omitted entirely and fuel is taken directly into the nozzle 55 from the well 50. The suction pressure engine speed gradients or characteristics of certain fuel passages of the burner carburetor are relatively less in slope beginning with the nozzle 55 proceeding into the wells 54, 53 and 50. Although the suction in the passage 72 may tend to vary over a wide range, there will be relatively little variation in the suction pressure in the well 50. Therefore the rate of flow of fuel through passage 56 will be relatively constant over a wide range of engine speed and consequently the rate of flow of fuel into the orifice 58 of nozzle 55 will be relatively uniform. Some air will be mixed with the fuel entering orifice 58 and air will also enter at 61 to assist in elevating the fuel in the nozzle 55 to the upper end thereof, by mixing with the fuel and causing it to bubble up through the nozzle.

It is therefore apparent that the liquid fuel for the burner is mixed with air before it ascends to the top of the nozzle. Then the air entering the passage 72 through the passages 97, 105 and 104 assists in lifting the fuel and air mixture through the nozzle 55 and mixes with the fuel in the passage 72, which may be termed a secondary fuel mixing chamber. The fuel which issues from the nozzle 55 into the burner is too rich to produce an explosion when ignited and burns relatively gradually, the burning particles being mixed again with air issuing from the distributing holes 34 and the sleeve 33. Air is mixed with the liquid fuel in three stages, namely, within the nozzle 55, within the secondary mixing chamber 72, and then within the burner, wherein combustion is completed in a relatively gradual manner without a series of small explosions or pops producing an annoying sound and tending to put out the burner.

As the engine suction increases in the passage 72 the piston 94 will be raised against the compression of the spring 99. Since a portion of the cylinder 92 above the piston 94 is in communication with the passage 72, this upward movement of the piston 94 will successively close the air passages 105 communicating with the fuel passage 72, and will gradually close the passages 107 and 106 communicating with combustion air passage 73. The elevation of the piston 94 will therefore tend to decrease the area of openings providing communication between outside atmosphere and passages 72 and 73, thereby tending to render the operation of the burner substantially uniform over a wide range of engine speeds, by automatically controlling the fuel mixture proportions and the relation of combustion air to the fuel mixture entering the burner.

When the burner has been operated to cause the engine to become sufficiently warm so that condensation of the fuel will not occur, the burner may be rendered inoperative by closing the valve 76 through the Boden wire control.

While the form of mechanism herein shown and described constitutes a preferred form of embodiment of the invention, it is to be understood that other forms might be adopted, all coming within the scope of the claims which follow:

I claim:

1. Apparatus for heating the intake of an internal-combustion engine comprising, in combination, a fuel burner having a combustion chamber communicating with the engine intake, and a fuel nozzle extending within the combustion chamber; a carburetor including a metering well, a fuel nozzle extending from the well, and a valve frame attached to the well and providing a secondary mixing chamber, receiving said fuel nozzle and having a passage for connecting the secondary mixing chamber with the burner fuel nozzle, and another passage for connecting the burner combustion chamber with atmosphere; and a device responsive to engine suction for controlling the admission of air directly to said passages.

2. Apparatus for heating the intake of an internal-combustion engine comprising, in combination, a fuel burner having a combustion chamber communicating with the engine intake, and a fuel nozzle extending within the combustion chamber; a carburetor including a metering well, a fuel nozzle extending from the well, and a valve frame attached to the well and providing a secondary mixing chamber, receiving said fuel nozzle and having a passage for connecting the secondary mixing chamber with the burner fuel nozzle, and another passage for connecting the burner combustion chamber with atmosphere; and a valve means having a common actuating member for controlling both passages.

3. Apparatus for heating the intake of an internal-combustion engine comprising, in combination, a fuel burner having a combustion chamber communicating with the engine intake, and a fuel nozzle extending within the combustion chamber; a carburetor including a metering well, a fuel nozzle extending from the well, and a valve frame attached to the well and providing a secondary mixing chamber, receiving said fuel nozzle and having a passage for connecting the secondary mixing chamber with the burner fuel nozzle, and another passage for connecting the burner combustion chamber with atmosphere; a valve means having a common actuating member for controlling both passages, and a device responsive to engine suction for controlling the admission of air directly to said passages.

4. Apparatus for heating the intake of an internal-combustion engine comprising, in combination, a fuel burner having a combustion chamber communicating with the engine intake, and a fuel nozzle extending within the combustion chamber; a carburetor including a metering well, a fuel nozzle extending from the well, and a valve frame attached to the well and providing a secondary mixing chamber, receiving said fuel nozzle and having a passage for connecting the secondary mixing chamber with the burner fuel nozzle, and another passage for connecting the burner combustion chamber with atmosphere; and a cylinder and piston device attached to the valve frame and responsive to engine suction for controlling the admission of air directly to said passages.

5. Apparatus for heating the intake of an internal-combustion engine comprising, in combination, a fuel burner having a combustion chamber communicating with the engine intake, and a fuel nozzle extending within the combustion chamber; a carburetor separate from the burner connected with the fuel nozzle; and valve means having a common actuating member for controlling both the admission of air to the carburetor and the admission of air directly to the burner combustion chamber.

6. Apparatus for heating the intake of an internal-combustion engine comprising, in combination, a fuel burner having a combustion chamber communicating with the engine intake, and a fuel nozzle extending within the combustion chamber; a carburetor separate from the burner connected with the fuel nozzle; and valve means having a common actuating member responsive to engine suction for automatically controlling both the admission of air to the carburetor and the admission of air directly to the burner combustion chamber.

7. Apparatus for heating the intake of an internal-combustion engine comprising, in combination, a fuel burner having a combustion chamber communicating with the engine intake, and a fuel nozzle extending within the combustion chamber; a carburetor connected with the fuel nozzle; and a unitary structure including a valve means having a common manually actuatable member and another common movable member automatically responsive to engine suction, each of said members operable to control both the admission of air to the carburetor and the admission of air directly to the burner combustion chamber.

In testimony whereof I hereto affix my signature.

GEORGE F. EMBSHOFF.